(12) United States Patent
Ur et al.

(10) Patent No.: US 9,100,938 B2
(45) Date of Patent: Aug. 4, 2015

(54) DIGITAL RELAY FOR OUT OF NETWORK DEVICES

(75) Inventors: Shmuel Ur, Shorashim (IL); Gad Sheaffer, Haifa (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 115 days.

(21) Appl. No.: 13/817,926

(22) PCT Filed: May 9, 2012

(86) PCT No.: PCT/US2012/037058
§ 371 (c)(1),
(2), (4) Date: Feb. 20, 2013

(87) PCT Pub. No.: WO2013/169240
PCT Pub. Date: Nov. 14, 2013

(65) Prior Publication Data
US 2013/0301516 A1 Nov. 14, 2013

(51) Int. Cl.
*H04B 7/14* (2006.01)
*H04W 4/00* (2009.01)
*H04W 76/02* (2009.01)
*H04W 88/04* (2009.01)

(52) U.S. Cl.
CPC ............. *H04W 76/02* (2013.01); *H04W 88/04* (2013.01)

(58) Field of Classification Search
CPC .... H04B 7/2606; H04W 88/04; H04W 80/04; H04W 88/06; H04W 28/04; H04W 72/04
USPC .......................................... 370/315, 328, 329
See application file for complete search history.

(56) References Cited

U.S. PATENT DOCUMENTS

| | | | |
|---|---|---|---|
| 2003/0233660 A1 | 12/2003 | Slemmer et al. | |
| 2007/0004391 A1 | 1/2007 | Maffeis | |
| 2007/0183321 A1* | 8/2007 | Takeda et al. | 370/229 |
| 2007/0183374 A1* | 8/2007 | Classon et al. | 370/338 |
| 2007/0274241 A1 | 11/2007 | Brothers | |
| 2008/0057985 A1 | 3/2008 | Tao | |
| 2010/0151865 A1* | 6/2010 | Camp et al. | 455/445 |
| 2010/0261479 A1* | 10/2010 | Hidaka | 455/445 |

OTHER PUBLICATIONS

International Search Report from International Application No. PCT/US12/037058 mailed Jun. 29, 2012.
"Cell Phones Calls Without Cell Towers," accessed at http://web.archive.org/web/20110309045023/http://www.plusultratech.com/2011/02/cell-phone-calls-without-cell-towers.html, published on Feb. 6, 2011, pp. 1-5.

(Continued)

*Primary Examiner* — Ronald B Abelson
(74) *Attorney, Agent, or Firm* — Brundidge & Stanger, P.C.

(57) ABSTRACT

In one example of digital relay for out of network devices, a communications device includes a detecting component configured to detect that one or more communication endpoints is within communication range, a message receiving component configured to receive a digital message from a first communication endpoint, and a message relaying component configured to transmit the digital message to the second communication endpoint, wherein the first communication endpoint and the second communication endpoint are not communicatively coupled to each other.

22 Claims, 5 Drawing Sheets

(56) References Cited

OTHER PUBLICATIONS

"Communications should not just be for the geographically and financially fortunate—communication should be freely available to everyone," Accessed at http://web.archive.org/web/20120501191843/http://www.servalproject.org/, Accessed on Oct. 6, 2014, pp. 3.

Angove, P., et al., "A Mobile Gateway for Remote Interaction with Wireless Sensor Networks," IEEE Sensors Journal, vol. 11, No. 12, Dec. 2011, pp. 3309-3310.

* cited by examiner

DIGITAL RELAY FOR OUT OF NETWORK DEVICES

CROSS-REFERENCE TO RELATED APPLICATION

This Application is the National Stage filing under 35 U.S.C. §371 of PCT Application Ser. No. PCT/US12/37058 filed May 9, 2012. The disclosure of the PCT Application is hereby incorporated herein by reference in its entirety.

TECHNICAL FIELD

The implementations and embodiments described herein pertain generally to the transmission of messages and data to and from electronic devices that may be beyond network coverage or otherwise not serviceable by a given network.

BACKGROUND

Present day technologies have enabled communications and information sharing that are virtually instantaneous. Further, such communications and information sharing are enabled in formats that are tailored to one or more digital communications infrastructures. However, left unsolved are challenges for enabling such communications and information sharing, in the aforementioned formats, when an end device is beyond network coverage or otherwise not serviceable, relative to a digital communications infrastructure.

SUMMARY

In one example embodiment, a communications device includes a detecting component configured to detect that one or more communication endpoints is within communication range, a message receiving component configured to receive a digital message from a first communication endpoint, and a message relaying component configured to transmit the digital message to the second communication endpoint, wherein the first communication endpoint and the second communication endpoint are not communicatively coupled to each other.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
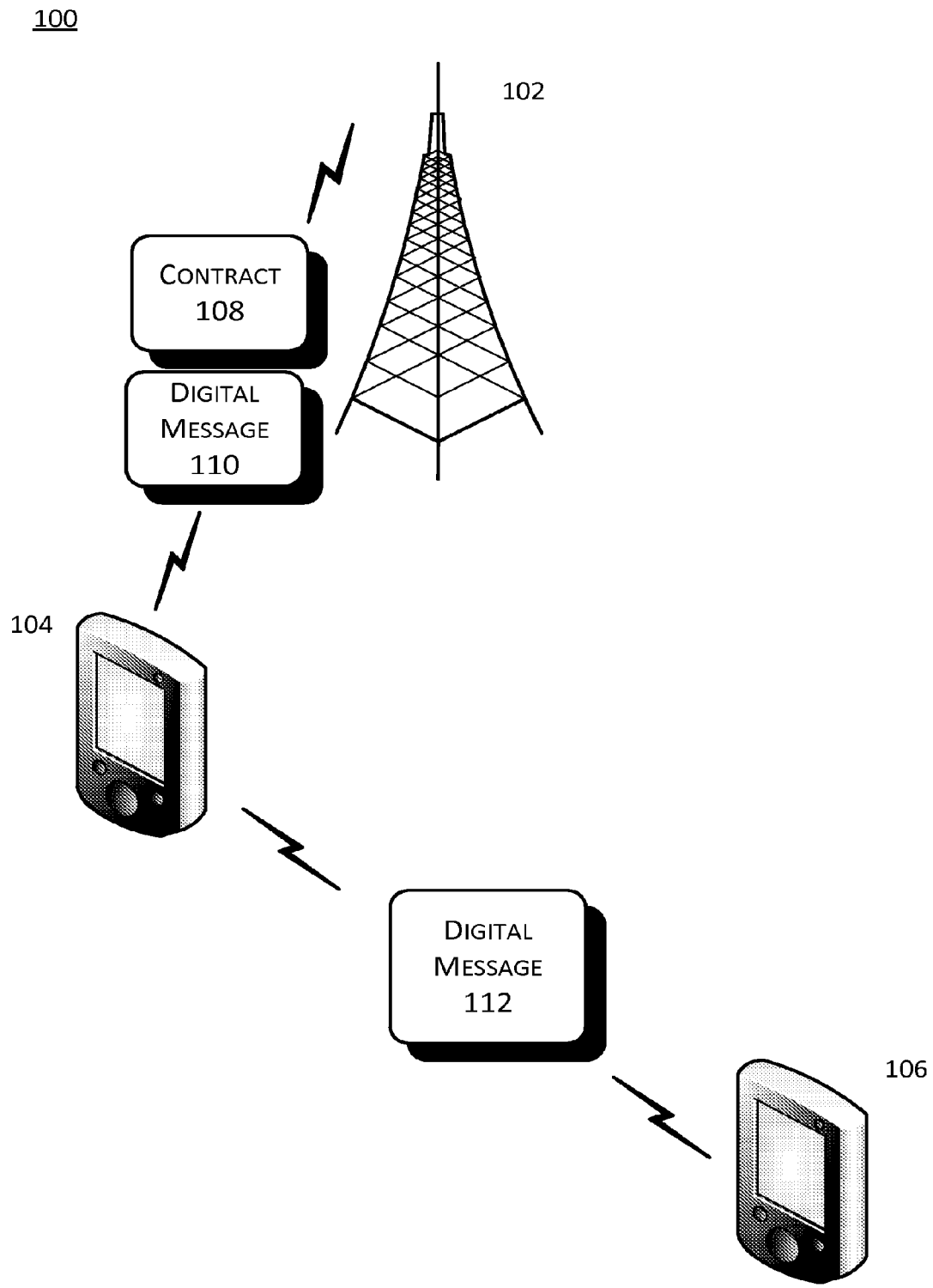
FIG. 1 shows an example system configuration for relaying at least one digital message for an end user device that is beyond network coverage or otherwise not serviceable by a given network, arranged in accordance with one or more embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 shows an example system configuration for relaying at least one digital message for an end user device that is beyond network coverage or otherwise not serviceable by a given network, arranged in accordance with one or more embodiments described herein. As depicted, system configuration 100 may include, at least, a base station 102, a proxy/courier device 104, and an end user device 106. System configuration 100 may further include transmitted data including a contract 108, a digital message 110, and a digital message 112.

Base station 102 may refer to a site at which antennas and electronic communications equipment are placed, e.g., a radio mast, tower or other high place (e.g., building), to create a cell in a cellular network. As implementations of digital relay for out of network devices are intended to be utilized for any mobile communications technology, e.g., GSM, CDMA, etc., base station 102 may refer to a cell site, which hosts multiple cell sites serving multiple mobile communications technologies including, but certainly not limited to, the aforementioned examples.

Proxy/courier device 104 may refer to an electronic device that is configured to transmit and receive digital messages over a radio link while moving around a wide geographic area by connecting to a mobile communications network provided by a wireless service provider. Proxy/courier device 104 may be implemented as a portion of a small-form factor portable (or mobile) electronic device such as a mobile phone, cell phone, smartphone, personal data assistant (PDA), a personal media player device, an application specific device, or a hybrid device that include any of the above functions. Proxy/courier device 104 may also be implemented as a personal computer including tablet, laptop computer and non-laptop computer configurations.

The aforementioned wireless service provider for implementing communications between base station 102 and proxy/courier device 104 may also be known as a mobile network carrier, wireless carrier, or even cellular company. Regardless of the alternate reference, the wireless service provider provides services for mobile communications subscribers. Proxy/courier device 104 may be configured to be communicatively coupled to base station 102 by any mobile communications technology, e.g., GSM, CDMA, etc., depending upon the wireless service provider.

Further, in addition to the mobile communications technologies that may be associated with base station 102, proxy/courier device 104 may be configured to transmit/receive data or otherwise share information utilizing non-cellular technologies such as conventional analog AM or FM radio, Wi-Fi™, wireless local area network (WLAN or IEEE 802.11), WiMAX™ (Worldwide Interoperability for Microwave Access), Bluetooth™, and other analog and digital wireless voice and data transmission technologies.

End user device 106 may also refer to an electronic device that is configured to transmit and receive digital messages over a radio link while moving around a wide geographic area by connecting to a mobile communications network provided by a wireless service provider. End user device 106 may also be implemented as a portion of a small-form factor portable (or mobile) electronic device such as a mobile phone, cell phone, smartphone, PDA, a personal media player device, an application specific device, or a hybrid device that include any of the above functions. End user device 106 may also be implemented as a personal computer including tablet, laptop computer and non-laptop computer configurations. Further still, end user device 106 may be implemented as a statically mounted device, e.g., sensor, which, in spite of its communications capabilities, remains stationary to execute the functions for which it is intended. End user device 106 may be configured to be communicatively coupled to other devices by such non-cellular technologies, as well as any mobile communications technology, e.g., GSM, CDMA, etc., depending upon the wireless service provider.

Further, end user device 106 may also be configured to transmit/receive data or otherwise share information utilizing non-cellular technologies such as conventional analog AM or FM radio, Wi-Fi™, wireless local area network, WiMAX™, Bluetooth™, and other analog and digital wireless voice and data transmission technologies. In addition, end user device 106 may occasionally seek proxy devices passing by so as to send out to the network messages containing its updated location information, based perhaps on, e.g., GPS location, so that base station 102 may efficiently find a most appropriate one of proxy 104 headed to the updated location.

Contract 108 may refer to an electronic or digital agreement between the proxy/courier device 104 and the wireless service provider that owns or otherwise manages mobile communications technology via base station 102. Alternatively, contract 108 may be executed via a website or even as a documented agreement between a user of proxy/courier device 104 and the wireless service provider. Regardless, in accordance with various embodiments of digital relay for out of network devices, a service agreement may be verified by individuals or entities exercising control over proxy/courier device 104 and the wireless service provider by the time contract 108 is transmitted between base station 102 and proxy/courier device 104. Contract 108 may be implemented as a series of communications between the wireless service provider via base station 102 and proxy/courier device 104, including text messages or emails, in MMS, SMS, HTML, etc., format. Alternatively, the series of communications may be implemented via a client application hosted on proxy/courier device 104 and provided by the wireless service provider to which base station 102 corresponds.

In sum, contract 108 may refer to at least a portion of a service agreement by which a user of proxy/courier device 104 agrees to have proxy/courier device 104 participate in digital relay for out of network devices, in accordance with the embodiments described herein, with compensation terms potentially varying for successful and unsuccessful proxy/courier transmissions.

Digital message 110 may refer to a text message, email, blog entry, etc., which may be transmitted between base station and proxy/courier device 104, intended for end user device 106. Thus, digital message 110 may be a digital message in MMS, SMS, HTML, etc., format. Of course, the form and format of digital message 110 is not so limited; rather, the above-examples are intended to illustrate the variety of digital messages that may be sent and received in various embodiments of digital relay for out of network devices.

Further, digital message 110 may be encrypted or decrypted. For example, for non-limiting descriptive purposes, digital message 110 may be transmitted from base station 102 to proxy/courier device 104 as an encrypted message, and further transmitted from proxy/courier device 104 to base station 102 as a decrypted message.

Digital message 112 may refer to a text message, email, blog entry, etc., which may be transmitted between proxy/courier device 104 and end user device 106. In fact, digital message 110 may be the same digital message as digital message 112, or a different one, for example—a service message that is part of the payload delivery protocol. Thus, digital message 112 may also be, for example, a digital message in MMS, SMS, HTML, etc., format. Further, digital message 112 may also be encrypted or decrypted. For example, for non-limiting descriptive purposes, digital message 112 may be transmitted from end user device 106 to proxy/courier device 104 as an encrypted message and further transmitted from proxy/courier device 104 to end user device as a decrypted message.

Figure 2:
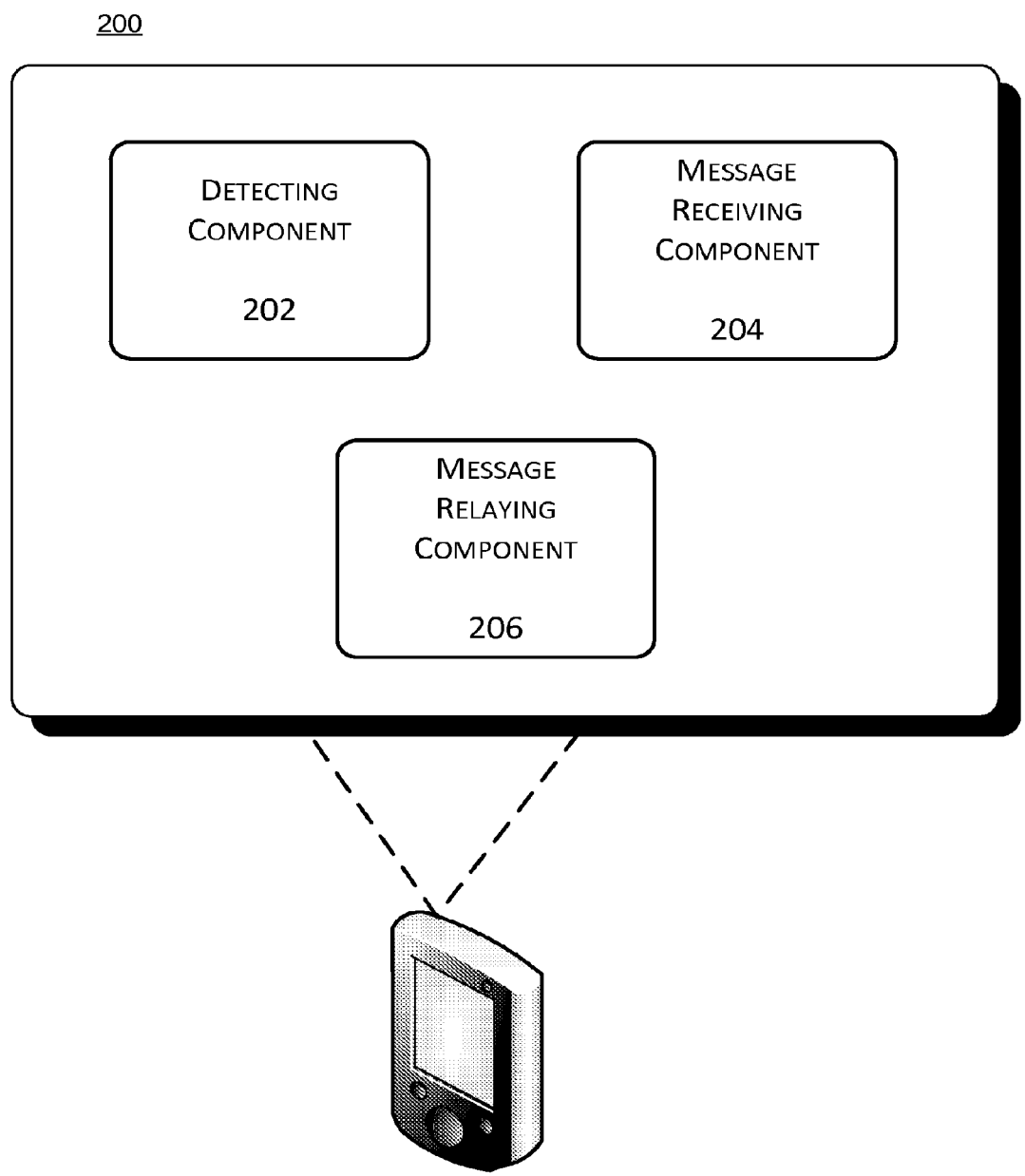
FIG. 2 shows an example configuration of some components that may be included in an electronic device, arranged in accordance with one or more embodiments described herein.

FIG. 2 shows an example configuration of some components that may be included in an electronic device, arranged in accordance with one or more embodiments described herein. Electronic device 200 may include, at least, detecting component 202, message receiving component 204, and message relaying component 206. Typically, though not exclusively, the components of electronic device 200 described herein may refer to software components or modules utilized to execute the respective functions. However, the components may further be implemented as hardware and/or firmware. Further still, the functions described for each of the respective components of electronic device 200 may be combined with any of the other components or even removed from electronic device 200, and yet the corresponding functionality may still be executed by the remaining components either singularly or in combination.

Electronic device 200 may be implemented as proxy/courier device 104 in accordance with various embodiments of digital relay for out of network devices; however, in accordance with alternate embodiments, electronic device 200 may be implemented as both proxy/courier device 104 and end user device 106. Electronic device 200 is described below, first, as implemented as proxy/courier device 104 and then, second, as implemented as end user device 106.

Detecting component 202 may refer to a component that is configured to detect the presence of other either base station 102 or end user device 106 for communications therewith. Thus, detecting component 202 may be configured to detect communications endpoints in accordance with both the aforementioned mobile communications technologies and the non-cellular technologies. More particularly, to detect the proximity of, and accordingly couple communicatively with, base station 102, detecting component 202 may be configured to be communicatively coupled to base station 102 by any mobile communications technology, e.g., GSM, CDMA, etc., depending upon the wireless service provider. Further, to detect the proximity of, and accordingly couple communicatively with, end user device 106, detecting component 202 may be configured to transmit a short-range detection signal and, subsequently couple communicatively to end user device 106 by utilizing non-cellular technologies such as conventional analog AM or FM radio, Wi-Fi™, wireless local area network, WiMAX™, Bluetooth™, and other analog and digital wireless voice and data transmission technologies, as well as point to point cellular technology.

Message receiving component 204 may refer to a component that is configured to receive digital messages from either of base station 102 or end user device 106. In addition, at least some embodiments may include message receiving component 204 transmitting, in return, a delivery receipt, which may be utilized in a compensation scheme established by contract 108. As set forth above, message receiving component 204 may receive contract 108 and/or digital message 110 from base station 102.

Contract 108 may be configured to obligate proxy/courier device 104 to deliver digital message 110 to end user device 106 or to deliver digital message 112 from end user device 106 to base station 102. Regardless, as received from base station 102, contract 108 and/or digital message 110 may be encrypted or decrypted.

Digital message 110 may refer to a text message, email, blog entry, etc., which may be transmitted from base station to proxy/courier device 104, intended for end user device 106 as a further destination. Typically, though not exclusively, digital message 110 may be a digital message or information originally sent or summoned from a third party for receipt or sharing at end user device 106, which may be, for a variety of reasons, out of network coverage or otherwise not serviceable by a given network to which base station 102 corresponds.

Message receiving component 204 may further be configured to receive digital message 112 from end user device 106.

Digital message 112 may also refer to a text message, email, blog entry, etc., which may be transmitted from proxy/courier device 104 to end user device 106, intended for at least base station 102 as a further destination. Alternatively, message 112 may also include location information pertaining to a potential location of end user device 106, as sent from proxy/courier device 104. As set forth above, digital message 110 may be the same digital message as digital message 112. Typically, though not exclusively, digital message 110 may be a digital message or information originally intended for receipt or sharing by a third party, from end user device 106. End user device 106 may be beyond network coverage or otherwise not serviceable by a given network to which base station 102 corresponds.

Message relaying component 206 may refer to a component that is configured to transmit digital messages, received by message receiving component 204, from proxy/courier device 104 to either of end user device 106 or base station 102.

When message receiving component 204 receives digital message 110 from base station 102, message relaying component 206 may transmit digital message 112 from proxy/courier device 104 to end user device 106 via a short-range communication protocol. As set forth above, digital message 110 and digital message 112 may be the same message.

More particularly, when message receiving component 204 receives digital message 110 from base station 102 in encrypted form, message relaying component may transmit digital message 112 from proxy/courier device 104 to end user device 106 in decrypted form. Thus, embodiments of proxy/courier device 104 may include at least one of message receiving component 204 and message relaying component 206 configured to decrypt messages. The encryption/decryption of digital messages in accordance with various embodiments of digital relay for out of network devices may be implemented by, e.g., public key encryption or other encryption/decryption technologies.

Alternatively, when message receiving component 204 receives digital message 112 from end user device 106 via a short-range communication protocol, message relaying component 206 may transmit digital message 110 from proxy/courier device 104 to end user device 106, likely intended for a third party device.

Similar to the above description, embodiments of proxy/courier device 104 may include at least one of message receiving component 204 and message relaying component 206 configured to decrypt messages. Thus, digital message 110 received from message relaying component 206 on proxy/courier device 104 may be received in decrypted form or may be decrypted using various encryption/decryption technologies. However, alternative embodiments may contemplate digital message 110 being received by end user device 106, via proxy/courier device 104, in encrypted form.

Thus, electronic device 200 is described above as implemented as proxy/courier device 104. The following is an example description of electronic device 200 implemented as end user device 106, which may be, for a variety of reasons, beyond network coverage or otherwise not serviceable by a given network to which base station 102 corresponds.

Detecting component 202 may refer to a component that is configured to detect the presence of proxy/courier device 104. To detect the proximity of, and accordingly couple communicatively with, proxy/courier device 104, detecting component 202 may be configured to transmit a short-range detection signal, and couple or connect communicatively to proxy/courier device 104. Such communicative connection or coupling may be implemented by non-cellular technologies such as conventional analog AM or FM radio, Wi-Fi™, wireless local area network, WiMAX™, Bluetooth™, and other analog and digital wireless voice and data transmission technologies, or by cellular communication where either 104 or 106 establish an ad-hoc cell.

Message receiving component 204 may refer to a component that is configured to receive digital message 112 from proxy/courier device 104 via a short-range communication protocol. Digital message 112 may refer to a text message, email, blog entry, etc., which may be transmitted from base station to proxy/courier device 104, intended for end user device 106 as a destination. That is, digital message 112 may be a digital message originally sent or summoned from a third party for receipt at end user device 106. End user device 106 may be, for a variety of reasons, beyond network coverage or otherwise not serviceable by a given network to which base station 102 corresponds. Further, message receiving component may be configured to return, shortly after receipt of digital message 112, a delivery receipt, which may be utilized in a compensation scheme established by contract 108.

Message relaying component 206 may refer to a component that is configured to transmit digital message 112 from end user device 106 to proxy/courier device 104 via a short-range communication protocol. Digital message 112 may be transmitted from message relaying component 206 to proxy/courier device 104 in encrypted or decrypted form.

Figure 3:
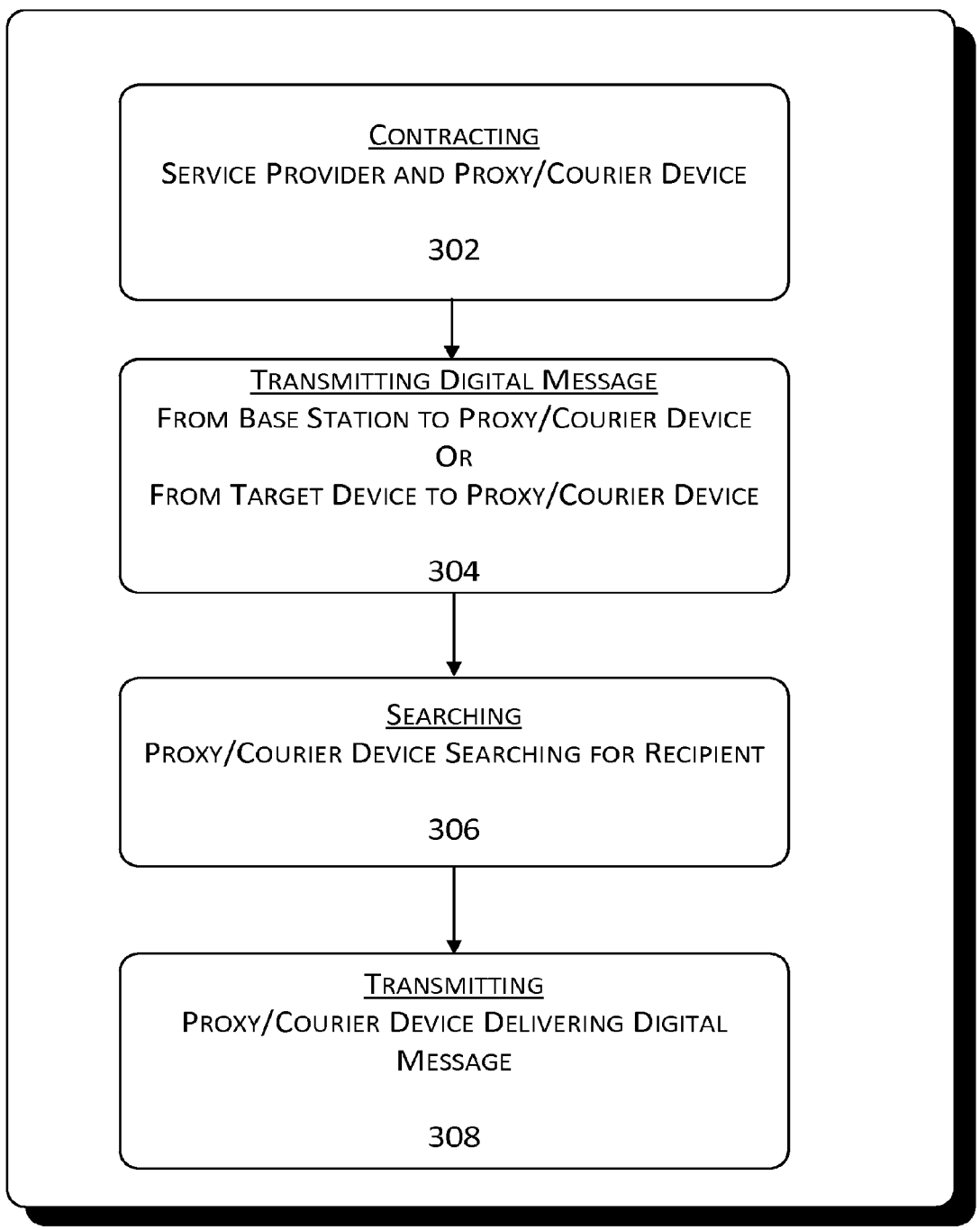
FIG. 3 shows an example processing flow for relaying at least one digital message for an end user device that is beyond network coverage or otherwise not serviceable by a given network, arranged in accordance with one or more embodiments described herein.

FIG. 3 shows an example processing flow for relaying at least one digital message for an end user device that is beyond network coverage or otherwise not serviceable by a given network, arranged in accordance with one or more embodiments described herein. Process 300 may be implemented by any of the embodiments referenced previously regarding FIGS. 1 and 2. Further, example process 300 may include one or more operations, actions, or functions as illustrated by one or more blocks 302, 304, 306, and 308. Although illustrated as discrete blocks, various blocks may be divided into additional blocks, combined into fewer blocks, or eliminated, depending on the desired implementation.

Process 300 may be implemented for transmitting one or more digital messages, likely originating from a third party source, from base station 102 to intended recipient end user device 106 which may be, for a variety of reasons, beyond network coverage or otherwise not serviceable by a given network to which base station 102 corresponds. Alternatively, process 300 may be implemented for transmitting one or more digital messages, likely intended for a third party device, from end user device 106, which may be, for a variety of reasons, out of network coverage or otherwise not serviceable by a given network to which base station 102 corresponds, to base station 102. Thus, process 300 is described below, first, for transmitting one or more digital messages 110 from base station 102 to end user device 106.

In the context of transmitting one or more digital messages 110 from base station 102 to end user device 106, one example scenario, though certainly not an exclusive one, may include base station 102 receiving digital message 110 from a third party, with end user device 106 indicated as a recipient thereof. However, if end user device 106 is beyond network coverage or otherwise not serviceable by a given network to which base station 102 corresponds, and if a current location of end user device 106 may be approximated based on recent detected usage, GPS tracking, or other means, proxy/courier device 104 may be selected or even volunteer to deliver digital message 110 to end user device 106 if proxy/courier device 104 makes known its movement trajectory towards the approximated current location of user device 106, whether in response to a query from base station 102 or as volunteered information. Processing may begin at block 302.

Block 302 may refer to a service provider to which base station 102 corresponds and an owner or user of proxy/courier device 104 contracting for a service agreement, which may be implemented as a series of communications between base station 102 and proxy/courier device 104, including text messages or emails, in MMS, SMS, HTML, etc., format. Alternatively, the series of communications may be implemented via a client application hosted on proxy/courier device 104 and provided by the wireless service provider to which base station 102 corresponds. Regardless, the service agreement may include an obligation for proxy/courier device 104 to attempt to relay digital messages to and from end user device 106, which may be beyond network coverage or otherwise not serviceable by a given network to which base station 102 corresponds. Assuming successful contracting between the service provider to which base station 102 corresponds and the owner or user of proxy/courier device 104, processing may proceed to block 304.

Block 304 may refer to base station 102 transmitting digital message 110 to proxy/courier device 104. Digital message 110 may be transmitted in encrypted or decrypted form. Further, such transmission may occur after detecting component 202 corresponding to proxy/courier device 104 detects and communicatively couples with base station 102. Processing may proceed to block 306.

Block 306 may refer to proxy/courier device 104, with digital message 110 stored therein, transmitting a short-range detection signal to search for end user device 106. To detect the proximity of, and accordingly couple communicatively with, end user device 106, detecting component 202 of proxy/courier device 104 may utilize non-cellular technologies such as conventional analog AM or FM radio, Wi-Fi™, wireless local area network, WiMAX™, Bluetooth™, and other analog and digital wireless voice and data transmission technologies. Processing may proceed to block 308.

Block 308 may refer to proxy/courier device 104 transmitting digital message 112 to end user device 106 and, in at least some embodiments, end user device 106 returning a message delivery receipt, which may be utilized in a compensation scheme established by contract 108. Digital message 112, as delivered, may be encrypted or decrypted, in accordance with the embodiments described herein.

Process 300 is described below, secondly, for transmitting one or more digital messages 110 from end user device 106 to proxy/courier device 104.

In the context of transmitting one or more digital messages 112 from end user device 106 to proxy/courier device 104, one example scenario, though certainly not an exclusive one, may include end user device 106 intending digital message 110 to be transmitted to or shared with a third party. However, if end user device 106 is beyond network coverage or otherwise not serviceable by a given network to which base station 102 corresponds, proxy/courier device 104 may be utilized to deliver digital message 112 to proxy/courier device 104 for relay to base station 102 and, likely, the intended third party recipient. Processing may begin at block 302.

Block 302 may refer to a service provider to which base station 102 corresponds and an owner or user of proxy/courier device 104 contracting for a service agreement, as described above. Processing may proceed to block 304.

Block 304 may refer to end user device 106 transmitting digital message 112 to proxy/courier device 104. Digital message 112 may be transmitted in encrypted or decrypted form. Further, such transmission may occur after detecting component 202 corresponding to end user device 106 detects and couples communicatively with proxy/courier device 104 utilizing a short-range communication protocol. Processing may proceed to block 306.

Block 306 may refer to proxy/courier device 104, with digital message 112 stored therein, searching for base station 102. To detect the proximity of, and accordingly couple communicatively with, base station 102, detecting component 202 of proxy/courier device 104 may be configured to be transmit a short-range detection signal, and to connect or couple communicatively with end user device 106 using any mobile communications technology, e.g., GSM, CDMA, etc., depending upon the wireless service provider to which base station 102 corresponds. Processing may proceed to block 308.

Block 308 may refer to proxy/courier device 104 transmitting digital message 110 to base station 102, likely for further transmission to the intended third-party recipient. Digital message 110, as delivered, may be encrypted or decrypted, in accordance with the embodiments described herein.

Figure 4:
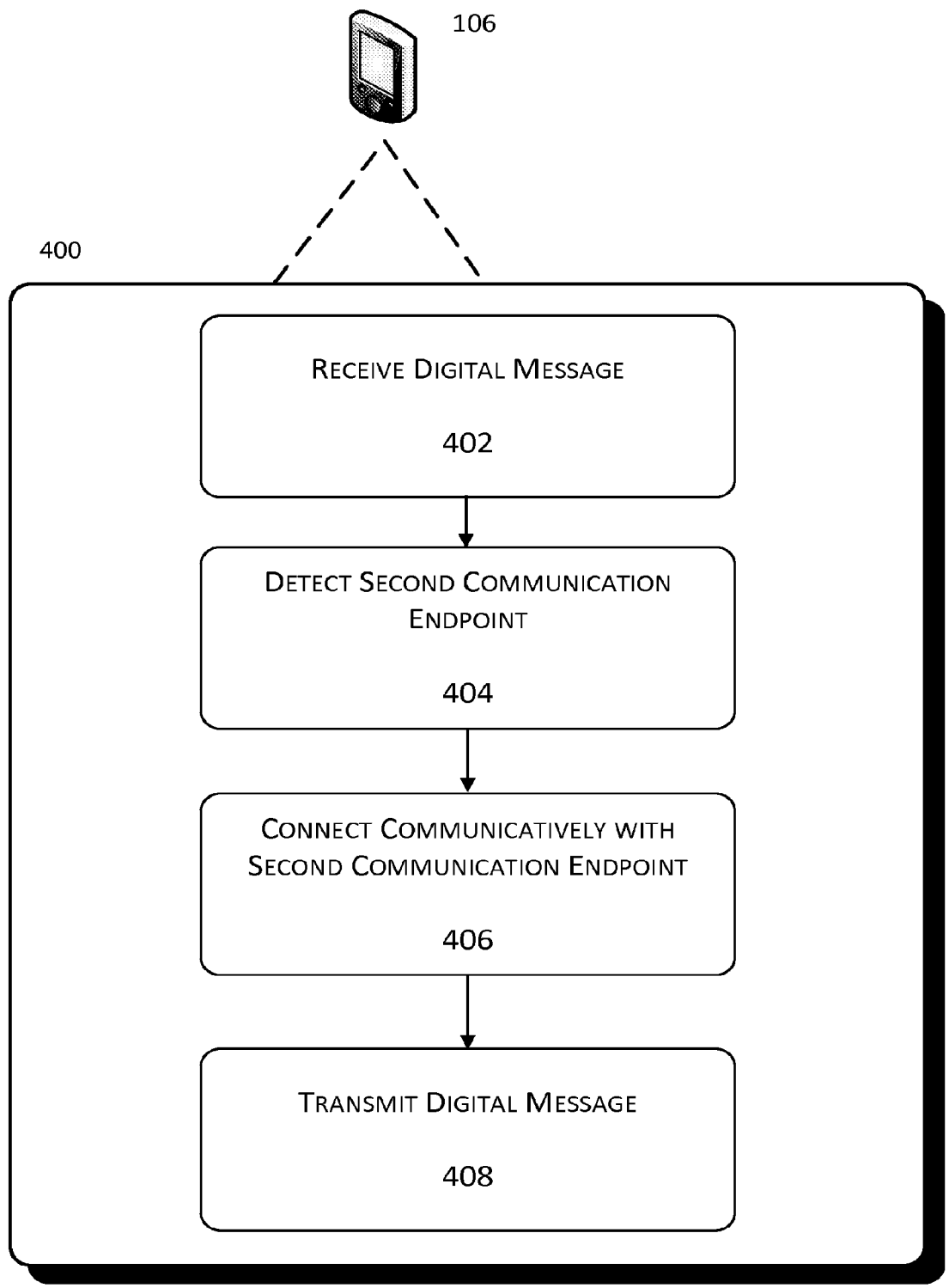
FIG. 4 shows an example processing flow for an electronic device to relay at least one digital message for electronic device that is beyond network coverage or otherwise not serviceable by a given network, arranged in accordance with one or more embodiments described herein.

FIG. 4 shows an example processing flow for an electronic device to relay at least one digital message for another electronic device that is beyond network coverage or otherwise not serviceable by a given network, arranged in accordance with one or more embodiments described herein. Process 400 may be implemented by any of the embodiments of proxy/courier device 104 referenced previously regarding FIGS. 1 and 2. Further, example process 400 may include one or more operations, actions, or functions as illustrated by one or more blocks 402, 404, 406, and 408. Although illustrated as discrete blocks, various blocks may be divided into additional blocks, combined into fewer blocks, or eliminated, depending on the desired implementation.

Process 400 may be implemented by proxy/courier device 104 to transmit one or more digital messages, likely originating from a third party source, from base station 102 to intended recipient end user device 106 which may be beyond network coverage or otherwise not serviceable by a given network to which base station 102 corresponds. Alternatively, process 400 may be implemented by proxy/courier device 104 for transmitting one or more digital messages, likely intended for a third party device, from end user device 106, which may be beyond network coverage or otherwise not serviceable by a given network to which base station 102 corresponds, to base station 102. Thus, process 400 is described below, first, for transmitting one or more digital messages 110 from base station 102 to end user device 106.

As set forth above, in the context of transmitting one or more digital messages 110 from base station 102 to end user device 106, one example scenario, though certainly not an exclusive one, may include base station 102 receiving digital message 110 from a third party, with end user device 106 indicated as a recipient thereof. However, if end user device 106 is not serviceable by a given network to which base station 102 corresponds, and if a current location of end user device 106 may be approximated based on recent detected usage, GPS tracking, or other means, proxy/courier device 104 may be selected or even volunteer to deliver digital message 110 to end user device 106 if proxy/courier device 104 makes known its movement trajectory towards the approximated current location of user device 106, whether in response to a query from base station 102 or as volunteered information. Processing may begin at block 402.

Block 402 may refer to message receiving component 204 on proxy/courier device 104 receiving digital message 110 from base station 102 using any mobile communications technology, e.g., GSM, CDMA, etc., utilized by the wireless service provider to which base station 102 corresponds. Processing may proceed to block 404.

Block 404 may refer to proxy/courier device 104 transmitting a short-range detection signal to search for end user device 106. Processing may proceed to block 406.

Block 406 may refer to proxy/courier device 104 connecting communicatively with end user device 106. To connect or couple communicatively with end user device 106, detecting component 202 of proxy/courier device 104 may be configured to be communicatively couple to end user device 106 utilizing short-range communication protocols, including but not limited to non-cellular technologies such as conventional analog AM or FM radio, WI-FI™, wireless local area network, WiMAX™, Bluetooth™, and other analog and digital wireless voice and data transmission technologies. Processing may proceed to block 408.

Block 408 may refer to proxy/courier device 104 transmitting digital message 112 to end user device 106. Digital message 112 may be digital message 110 in encrypted or decrypted form.

Accordingly, though end user device 106, whether a mobile device or static device, may be beyond network coverage or otherwise not serviceable by a given network to which base station 102 corresponds, end user device 106 may still receive digital messages using the digital communications infrastructure implemented by the given network.

Process 400 is described below, secondly, for transmitting one or more digital messages 112 from end user device 106 to proxy/courier device 104.

Once again, in the context of transmitting one or more digital messages 112 from end user device 106 to proxy/courier device 104 and further intended for receipt by a third party device, one example scenario, though certainly not an exclusive one, may include end user device 106 addressing and transmitting digital message 112 to a third party. However, if end user device 106 is not serviceable by a given network to which base station 102 corresponds, proxy/courier device 104 may be selected or even volunteered to deliver digital message 112 to base station 102, for ultimate delivery to the intended third-party device, if proxy/courier device 104 makes known its presence to user device 106. Processing may begin at block 402.

Block 402 may refer to message receiving component 204 on proxy/courier device 104 receiving digital message 112 from end user device 106 using short-range communication protocols, including but not limited to non-cellular technologies such as conventional analog AM or FM radio, Wi-Fi™, wireless local area network, WiMAX™, Bluetooth™, and other analog and digital wireless voice and data transmission technologies. Processing may proceed to block 404.

Block 404 may refer to proxy/courier device 104 transmitting a detection signal to search for base station 102. Processing may proceed to block 406.

Block 406 may refer to proxy/courier device 104 connecting communicatively with base station 102. To connect or couple communicatively with base station 102, detecting component 202 of proxy/courier device 104 may be configured to be communicatively couple to base station 102 by using any mobile communications technology, e.g., GSM, CDMA, etc., utilized by the wireless service provider to which base station 102 corresponds. Processing may proceed to block 408.

Block 408 may refer to proxy/courier device 104 transmitting digital message 110 to base station 102. Digital message 110 may be digital message 112 in encrypted or decrypted form.

Accordingly, though end user device 106, whether a mobile device or static device, may be beyond network coverage or otherwise not serviceable by a given network to which base station 102 corresponds, end user device 106 may still transmit digital messages or share information using the digital communications infrastructure implemented by the given network.

Figure 5:
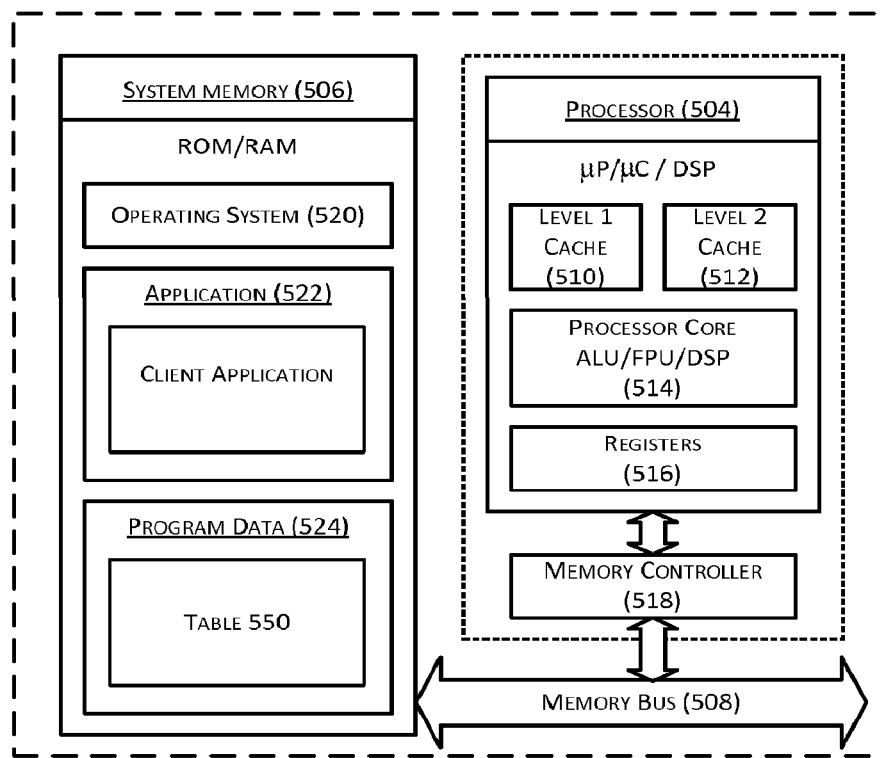
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of an appliance or device having a network element and/or any other computing device corresponding thereto, particularly as applicable to the applications and/or programs described above corresponding to the configuration 100 for smart appliance registration.

In a very basic configuration, a computing device 500 may typically include one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one caches 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may be configured to transmit or receive identification information pertaining to appliance/device 104, verify or validate such identification information, and transmit device data as described previously with respect to FIGS. 1-4. Program data 524 may include a table 550, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A device, comprising:
   a detecting component configured to:
      detect that one or more communication endpoints is within communication range, and
      inform at least one mobile communication device of an available communication connection therewith;
   a message receiving component configured to receive, from the at least one mobile communication device, a digital message when neither the device nor the at least one mobile communication device are communicatively coupled to a base station; and
   a message relaying component configured to transmit the digital message to the base station,
      wherein the device is a portable mobile communications device that is contracted with a digital communications service provider to relay digital messages between the at least one mobile communication device and the base station.

2. The device of claim 1, wherein the detecting component is configured to transmit a short-range detection signal in order to detect that the base station is within communication range.

3. The device of claim 1, wherein the message receiving component is configured to receive, from the at least one mobile communications device, the digital message formatted as any one of an MMS, SMS, or HTML message.

4. The device of claim 1, wherein the message receiving component is configured to receive, from the at least one mobile communications device, the digital message in an encrypted format.

5. The device of claim 1, wherein the message receiving component is configured to receive, from the at least one mobile communications device, the digital message in an encrypted format, and wherein the message relaying component is configured to transmit the digital message to the base station in a decrypted format.

6. The device of claim 1, wherein the message relaying component is configured to transmit the digital message to the base station via a short-range communication protocol.

7. A method, comprising:
   contracting with a digital communications service provider to relay digital messages between a mobile communication device and a base station;
   receiving, from the mobile communication device while not communicatively coupled to the base station, a digital message intended for the base station;
   detecting that the base station is within communication range;

coupling communicatively with the base station; and
transmitting the digital message to the base station.

8. The method of claim 7, further comprising, prior to the receiving, contracting with the digital communications service provider to relay digital messages between the mobile communication device and the base station.

9. The method of claim 7, wherein the digital message is any one of an MMS, SMS, or HTML message.

10. The method of claim 7, wherein the mobile communication device and the base station are both contracted to a common digital communications service.

11. The method of claim 7 wherein the receiving is implemented using a short-range communication protocol.

12. The method of claim 7 wherein the transmitting is implemented using a short-range communication protocol.

13. The method of claim 7, wherein the receiving includes receiving the digital message in an encrypted format.

14. The method of claim 7, wherein the receiving includes receiving the digital message in an encrypted forma, and wherein the transmitting includes transmitting the digital message in a decrypted format.

15. A non-transitory computer-readable medium that stores one or more executable instructions that, when executed, cause one or more processors to:
   contract with a digital communications service provider to relay digital messages between a first communication endpoint and a second communication endpoint;
   receive, from the first communication endpoint, a digital message intended for the second communication endpoint,
      wherein the first communication endpoint and the second communication endpoint are both contracted to the digital communications service provider but are not communicatively coupled to each other;
   detect that the second communication endpoint is within communication range;
   couple communicatively with the second communication endpoint; and
   transmit the digital message to the second communication endpoint.

16. The computer-readable medium of claim 15, wherein the one or more instructions, when executed, cause the one or more processors to receive, from the first communication endpoint, the digital message in an encrypted format.

17. The computer-readable medium of claim 15, wherein the one or more instructions, when executed, cause the one or more processors to:
   receive, from the first communication endpoint, the digital message in an encrypted format; and
   transmit the digital message, to the second communication endpoint, in a decrypted format.

18. A system, including:
   a courier communication device;
   a target communication device configured to when neither the communication courier device nor the target communication device are communicatively coupled to a base station:
      transmit, to the courier communication device, an outbound digital message intended for at least one receiving communication device, and
      receive, from the courier communication device, an inbound digital message sent from an originating communication device; and
   a transceiver configured to:
      initiate communication with the courier communication device,
      receive the outbound digital message from the courier communication device for further transmission to the at least one receiving communication device, and
      transmit the inbound digital message, received from the originating communication device, to the courier communication device.

19. A method, comprising:
   a proxy communication device contracting with a digital communication service provider to relay digital messages between a target communication device and a base station;
   the target communication device searching for the proxy communication device;
   the target communication device transmitting a digital message to the proxy communication device via a short-range communication protocol when neither the proxy communication device nor the target mobile communication device are communicatively coupled to the base station;
   the proxy communication device transmitting the digital message to the base station via a wireless communication protocol; and
   the base station transmitting the digital message to an intended recipient via the wireless communication protocol.

20. A method, comprising:
   a base station contracting with a proxy communication device to deliver a digital message to a target communication device;
   the base station transmitting the digital message to the proxy communication device using a wireless communication protocol;
   the proxy communication device searching for the target communication device using short range search signals;
   the target communication device acknowledging receipt of at least one of the short range search signals; and
   the proxy communication device transmitting the digital message to the target communication device using a short range communication protocol when neither the proxy communication device nor the target communication device are communicatively coupled to the base station.

21. The method of claim 20, wherein the base station transmits the digital message to the proxy communication device, using a wireless communication protocol, in an encrypted format.

22. The method of claim 20,
   wherein the base station transmits the digital message to the proxy communication device in an encrypted format, and
   wherein the proxy communication device transmits the digital message to the target communication device in a decrypted format.

* * * * *

UNITED STATES PATENT AND TRADEMARK OFFICE
CERTIFICATE OF CORRECTION

Page 1 of 1

PATENT NO. : 9,100,938 B2
APPLICATION NO. : 13/817926
DATED : August 4, 2015
INVENTOR(S) : Ur et al.

It is certified that error appears in the above-identified patent and that said Letters Patent is hereby corrected as shown below:

In the specification

In Column 1, Line 8, delete "§371" and insert -- § 371 --, therefor.

In the claims

In Column 15, Line 19, in Claim 14, delete "forma," and insert -- format, --, therefor.

In Column 15, Line 41, in Claim 16, delete "The" and insert -- The non-transitory --, therefor.

In Column 15, Line 45, in Claim 17, delete "The" and insert -- The non-transitory --, therefor.

Signed and Sealed this
Twenty-eighth Day of June, 2016

Michelle K. Lee
*Director of the United States Patent and Trademark Office*